Patented Mar. 19, 1940

2,193,873

UNITED STATES PATENT OFFICE 2,193,873

WATER DISPERSIBLE LECITHIN

Stroud Jordan, Brooklyn, N. Y.

No Drawing. Application May 14, 1937,
Serial No. 142,621

3 Claims. (Cl. 252—6)

Commercial lecithin as an article of commerce contains from 20 to 40% of an oil or fat. Lecithin is usually dissolved in a fat in order that it may be readily dispersible in a mixture of an oleaginous or fatty material with an insoluble granular material. A mixture of oleaginous material and granular material is cocoa-butter and sugar, shortening and flour and the like. The addition of lecithin to these mixtures tends to reduce the viscosity to a large degree and thus effects a better and more intimate mixture of the constituents.

The usual oil or fat solution of lecithin is practically insoluble in water and it is quite difficult to get the lecithin dispersed in water in the form of a good or permanent emulsion. In the confectionery and pastry arts it is quite common to make a water emulsion of lecithin by heating a mixture of water and lecithin to a temperature of from 170° to 185° C. for a considerable period of time in order to make an emulsion so that the emulsion will facilitate the mixing of the shortening or fatty materials with the granular materials such as sugar, flour and the like. The difficulty with which the fat solution of lecithin is brought into an emulsion makes the process quite slow and furthermore it requires comparatively high temperatures to get the emulsion and such high temperatures are not always desirable in the pastry and confectionery arts.

Lecithin is used quite extensively in the preparation of food products, chocolate coatings, bread, shortenings and the like. The lecithin is soluble in the fats or oils which are used in the above food products and has the distinct function of modifying the viscosity of the mixture. It is important therefore that the lecithin should be edible and non-toxic when used with food products.

I have discovered that lecithin may be readily dispersed in water to form stable and substantially permanent emulsions. To accomplish this the lecithin is dissolved in ethyl lactate solution. The ethyl lactate solution is placed in a stable emulsion with water as the continuous phase. The amount of ethyl lactate solution which may be used with the lecithin varies from ten to fifty percent by weight of the lecithin. The mixture of thirty to fifty per cent of ethyl lactate with lecithin produces a creamy or paste-like mass which can be readily dispersed in water. The amount of ethyl lactate used depends upon the use for which it is to be applied and preferably about forty percent of ethyl lactate by weight of the lecithin gives the proper lecithin-ethyl lactate solution.

The ethyl lactate is readily soluble in lecithin and is soluble in all proportions in water. The ethyl lactate is also quite readily soluble in most fats and practically all of the animal and vegetable oils. Furthermore the ethyl lactate is soluble in some petroleum oil distillates.

To prepare the ethyl lactate-lecithin solution the usual oil or fatty material which is associated with lecithin is removed or extracted before the lecithin is dissolved in the ethyl lactate. Preferably the fats are extracted from the lecithin with acetone and the acetone is removed from the lecithin by vacuum distillation or evaporation. The oil or fat-free lecithin is dissolved in from ten to fifty percent by weight of ethyl lactate.

Ethyl lactate has a comparatively high boiling point of 154° C. which is very advantageous in holding this dispersing agent in the mixture and in the oleaginous-granular material mixture in which the lecithin-ethyl lactate solution is used.

When the ethyl lactate-lecithin solution is used in conjunction with pastry and confectionery work it is preferably placed in a water emulsion. From .1 to 10% of ethyl lactate-lecithin solution by weight of the water will quite readily be dispersed in the water at ordinary room temperatures and will form a stable permanent emulsion that will hold for several weeks. This permanent emulsion is then added to the mixture of oleaginous and granular material and the water emulsion readily disperses throughout the mass to better effect the mixing of the mixture in which it is dispersed.

In place of ethyl lactate, propylene glycol may be used. The glycol is soluble in lecithin, soluble in all proportions in water, soluble in fats and oils of animal or vegetable origin. Propylene glycol has a boiling point of 189° C. and is particularly advantageous where lecithin is used in the varnish and paint industry and the textile and leather industries and in insecticides. Ethyl lactate is also useful in the above mentioned industries but it is non-toxic whereas propylene glycol is not usually used in the manufacture of food products. The propylene glycol is used in substantially the same proportions in making a lecithin-propylene glycol solution and in preparing a water emulsion of the propylene glycol-lecithin material as when ethyl lactate is used. Both propylene glycol and ethyl lactate solutions of lecithin may be used to advantage in the preparation of insecticides. The lecithin is a contact insecticide and the ethyl lactate and propylene glycol are effective dispersing agents.

The ethyl lactate is a neutral ester and it is preferred to use a neutral dispersing agent for making the water emulsion of lecithin.

Having thus described the invention what is claimed as new is:

1. A lecithin compound comprising lecithin dissolved in ethyl lactate.

2. A lecithin compound comprising lecithin which is free of oil or fat dissolved in ethyl lactate.

3. A lecithin compound comprising an oil or fat-free lecithin dissolved in from ten to fifty percent by weight of ethyl lactate.

4. A method of modifying the viscosity of a mixture of an oleaginous material with an insoluble granular material comprising treating the mixture with a water emulsion of lecithin dispersed with ethyl lactate.

5. A method of modifying the viscosity of a mixture of an oleaginous material with an insoluble granular material comprising treating the mixture with a water emulsion of a lecithin-ethyl lactate solution dispersed in water wherein the ethyl lactate-lecithin mixture comprises from .1 to 10% by weight of the water.

6. A method of modifying the viscosity of a mixture of an oleaginous material with an insoluble granular material comprising treating the mixture with a water emulsion containing lecithin dissolved in from five to forty percent by weight of ethyl lactate and the ethyl lactate-lecithin mixture being dispersed in water to form an emulsion wherein the ethyl lactate-lecithin solution constitutes from .1 to 10% by weight of the water.

7. A lecithin compound comprising lecithin dissolved in a neutral organic ester ethyl lactate.

8. A water emulsion of lecithin with the water in the continuous phase, said emulsion being stabilized by ethyl lactate.

STROUD JORDAN.